Patented Nov. 19, 1940

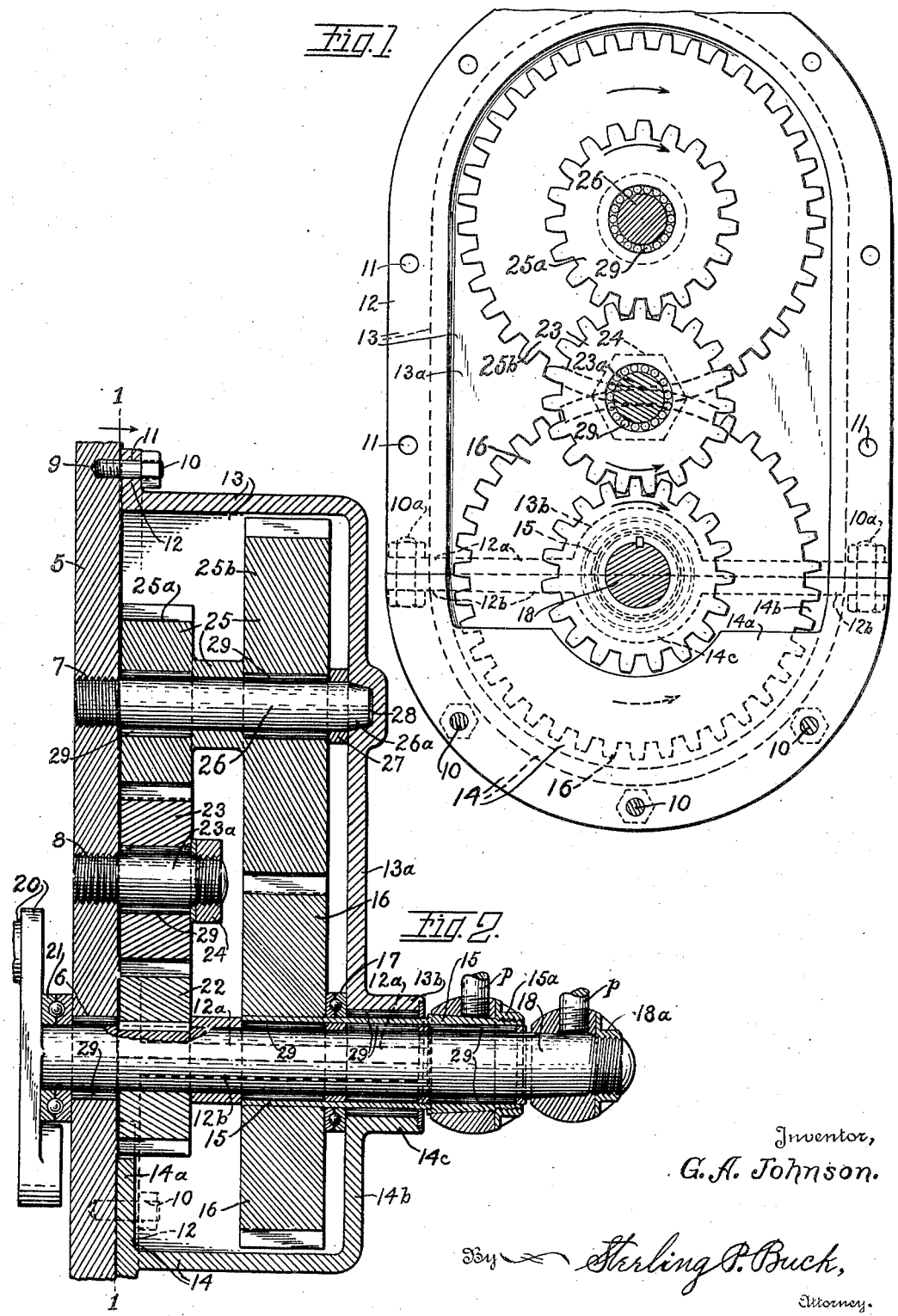

2,222,102

UNITED STATES PATENT OFFICE 2,222,102

AIRPLANE PROPELLER DRIVING MECHANISM

Garland A. Johnson, Alameda, Calif.

Application July 9, 1940, Serial No. 344,483

5 Claims. (Cl. 74—389)

This invention relates to an improved airplane propeller driving mechanism.

One object of the invention is to provide an exceedingly simple and thoroughly practical self-lubricating gear-mechanism for rotating axially alined adjacent propellers in opposite directions.

A further object is to provide an improved gear-casing that comprises a supporting unit and a combined hood and half-bearing normally united and combined with propeller-shafts to form a completely closed space or chamber in which the gears and lubricating oil are confined for automatic lubrication of the gears and their bearings.

A further object is to provide the combined hood and half-bearing with a socket having an inwardly converging wall normally fitting around a tapered end of a stub-shaft that carries a gear-unit, so that the stub-shaft cannot be deflected or otherwise moved when engaged with said socket, and so that the engagement and disengagement of the stub-shaft and socket can be easily and quickly effected when the hood and half-bearing unit is being placed in or displaced from its normal position; the purpose of removing or displacing the hood and bearing unit being to inspect and/or repair and/or replace any part of the contents of the gear-casing without the necessity of removing the propellers or of affecting any operative relation of the gear-mechanism, so the latter can be operated for visual examination while being operated.

Other objects and important features are pointed out or implied in the following details of description, in connection with the accompanying drawing in which:

Fig. 1 is a sectional view taken substantially along the line 1—1 of Fig. 2, viz., between the front block or upright plate of the motor or engine and the securing flanges of the other gear-case units, the upper end of the flange being broken off.

Fig. 2 is a vertical sectional view in the plane of the axes of the gear-wheels or spur-gears and propeller-shafts, the relatively long propeller-shaft being only partly in section, and the relatively long and short stub-shafts being not in section, the lower end of the securing flange of the unit comprising the combined oil-pan and half-bearing being broken off, only one of the numerous securing bolts or screws being shown in this figure.

Referring to the drawing in detail, in which similar reference numerals refer to similar parts in both views, the invention is described in detail as follows:

The upright plate or block 5, of the motor or engine, is provided with a journal-bearing therethrough, also screw-threaded openings 7 and 8, and a number of threaded cavities or bores 9, the latter being for engagement of any suitable number of screws or bolts 10 that extend through apertures 11 in the flanges 12 of the gear-case elements 13 and 14 which are normally but removably or detachably secured together by screws or bolts 10a through apertured flanges 12a and 12b of the respective casing elements or gear-case elements 13 and 14. The element 14 is a combined oil-pan and half-journal-bearing, its rear wall 14a being united with the plate 5, for instance, closely fitted and secured thereagainst so as to be leak-proof at the joint between the plate 5 and wall 14a, and the front wall 14b has a half-journal-bearing 14c at its upper end.

The gear-case-element 13 is a combined hood and half-journal-bearing, and is normally disposed in the position shown in Fig. 2, its front wall 13a having the half-journal-bearing 13b fitted on the half-journal-bearing 14c so as to combine therewith in forming a complete journal-bearing in axial alinement with the journal-bearing 6 of the plate 5.

A tubular propeller-shaft 15 is seated for rotation in the composite journal-bearing 13b—14c and is united with a spur-gear 16 that extends nearly to the bottom of the oil-pan, so its fast rotation causes oil to be lifted and splashed for lubricating all contents of the gear-casing, including thrust-bearing 17 and the said journal-bearings.

A propeller-shaft 18, which is relatively long, is seated for rotation in the journal-bearing 6 and in the tubular shaft 15 which constitutes a second journal-bearing for shaft 18; and this latter shaft has a propeller-securing means 18a, similar to the means 15a for the shaft 15, these being nuts screwed on the respective shafts and abutting against the respective propeller-hubs in which are seen the connecting ends of propeller-blades p. A crank 20, on the shaft 18 may be considered as the means for rotating the latter, and a thrust-bearing 21 precludes relative forward motion of the shaft 18.

A driving spur-gear 22 is keyed or otherwise secured on or united with the shaft 18, and this is in mesh with an intermediate spur-gear 23 which is rotatably mounted on a stub-axle 23a, the latter being united with the plate 5, preferably by left-hand screw-threads where it is designed that this wheel 23 shall be turned counter-clockwise, and the same is true of the front or free end of this stub-axle and its retaining nut 24.

A driven gear-member 25 consists of two united spur-gears 25a and 25b, the latter being intermeshed with the spur-gear 16, and the spur-gear 25a being intermeshed with the spur-gear 23, so the gear-member 25 is rotated, on its stub-axle 26, in the opposite direction to the spur-gear 23, and in the same direction of the spur-gear 22, hence, it drives the spur-gear 16 and its propeller-shaft 15 in the opposite direction to the spur-gear 22 and its propeller-shaft 18, and inasmuch as the spur-gears 25b and 16 are of the same diameter, they rotate at substantially the same speed; so, inasmuch as the wheels 25a and 22 are of the same diameter and rotate at the same speed, the resultant speeds of the propellers are equal. However, if desirable to make them unequal, such could be accomplished by substituting wheels of different diameters for wheels 16 and 25b. Moreover, it is within the scope of this invention to substitute other intermediate transmission means for the spur-gear 23, although this present means 23 is preferable for several reasons.

Inasmuch as the stub-axle 26 is relatively long for accommodating the two united spur-gears 25, it is very desirable to support the front end of this axle, as well as its rear end, to prevent deflection and vibration thereof when subjected to the effects of pressure and speed; and it is also desirable and important to make the front-end support serve as a means for preventing displacement of the threaded end of this axle where it engages with the plate 5 at 7, thereby eliminating necessity for any form of nut-lock or thread-lock. Moreover, it is desirable that the front-end support be such as to not interfere in the least with gaining access to the interior of the casing, viz., removing the hood 13; nor with gaining access to the wheels 23 and 25a, viz., by removing the gear-member 25 by simply sliding it and its spacing ring 27 forward after the hood 13 is removed. For these purposes, the front end of the axle 26 is forwardly tapered, at 26a, and the hood has a socket 28 formed therein to snugly embrace the tapered end when the hood is in place, as shown; but when all the bolts 10 and 10a are removed from the bolt-holes 11, the hood 13 can be removed by tilting its upper end forward until the socket 28 is clear of the axle 26, and can then be lifted upward, between the remainder of the gear-case and the propeller-blades.

For reducing friction and resistance, roller bearings are shown at 29, in the respective bearings; but the invention is not dependent on any particular form of bearings, nor on any of the specific details of construction except those that may hereinafter be specifically claimed.

It is well understood that several prior patents show mechanisms for effecting rotation of adjacent axially alined propellers in opposite directions, so I do not claim any such mechanism broadly; but what I claim as my invention is:

1. In an airplane propeller driving mechanism, a gear-casing-unit composed of an upright plate having a journal-bearing therethrough, and a combined half-bearing and oil-pan united with said plate and extending below said journal-bearing, in combination with a relatively long axle secured to said plate, a combined hood and half-bearing disposed in proper relation to combine with the first-said half-bearing in forming a composite journal-bearing in axial alinement with the first-said journal-bearing, a tubular propeller-shaft mounted for rotation in said composite journal-bearing and provided with means to secure a propeller thereon, a spur-gear united with said tubular propeller-shaft and extending into said oil-pan so it can carry oil upward for lubricating said journal-bearings as it rotates, a relatively long shaft mounted for rotation in the first-said journal-bearing and in said tubular propeller shaft and provided with means to secure a propeller thereon adjacent to first said propeller, a spur-gear on said relatively long axle and intermeshed with the first-said spur-gear, and transmission means operatively connected to the second-said spur-gear and to said relatively long propeller-shaft in proper relation to cause the tubular propeller-shaft to rotate in the opposite dirrection from that of the relatively long propeller-shaft.

2. The combination defined by claim 1, said combined hood and half-bearing being normally secured to said gear-casing-unit and engaged with said relatively long axle in proper relation to secure the latter against deflection and vibration.

3. The combination defined by claim 1, said combined hood and half-bearing being normally but removably secured to said gear-casing-unit and having a socket in which an end of said relatively long axle is snugly fitted so that the said axle is secured against displacement and vibration, and so that the combined hood and half bearing can be removed without affecting said axle or its adjuncts.

4. The combination defined by claim 1, said transmission means being inclusive of a driving spur-gear on said relatively long propeller-shaft, a driven spur-gear united with the second-said spur-gear, an intermediate spur-gear intermeshed with the driving spur-gear and driven spur gear, and a stub-axle on said plate and having said intermediate spur-gear mounted for rotation thereon.

5. In an airplane-propeller-driving mechanism, the combination of a gear-casing-unit that includes a half-bearing and also includes an axle having one end fixed with respect to other parts of the unit and having its other end free and tapered, a second gear-casing-unit which includes a half-bearing and an inwardly tapered socket which latter normally fits snugly around said tapered end and is free from locked engagement therewith so this second gear-casing-unit can be moved to and from the first said gear-casing-unit without affecting said axle or being affected thereby, said socket normally preventing displacement and vibrating of said axle, the first and second said half-bearings being normally fitted together and forming a complete journal-bearing, a propeller-shaft seated for rotation in said journal-bearing, a gear-unit united with said propeller-shaft, a gear-unit seated for rotation on said axle and operatively connected to the first-said gear-unit for effecting rotation of the latter, and means to effect rotation of the second said gear-unit.

GARLAND A. JOHNSON.